INVENTORS
HENRY R. CHOPE
JAMES L. GRIFFITH
DAVID A. SPITZ
REX W. DEWEY
PAUL H. TROUTMAN
By Cushman, Darby & Cushman
ATTORNEYS

United States Patent Office 3,513,310
Patented May 19, 1970

3,513,310
HIGH-SPEED NUCLEONIC MEASURING SYSTEM
Henry R. Chope, Columbus, James L. Griffith, Worthington, and David A. Spitz, Rex W. Dewey, and Paul H. Troutman, Columbus, Ohio, assignors to Industrial Nucleonics Corporation, a corporation of Ohio
Filed Mar. 10, 1967, Ser. No. 622,346
Int. Cl. G01t 1/16
U.S. Cl. 250—83.3    26 Claims

ABSTRACT OF THE DISCLOSURE

In a null self-balancing system for measuring a material characteristic, such as basic weight with a radiation gauge, use is made of the summation of the slow or mechanical feedback voltage or its counterpart and the fast or electronic output voltage from an amplifier receiving the transducer signal, to obtain from the summation voltage a fast response signal which represents information concerning the characteristic of the material being measured. The signal is obtained at a rate faster than a signal having similar information can be obtained from the mechanical feedback. The summation voltage is provided in a variety of ways including directly from the circuit itself, or from an additional slidewire electrically connected across the measuring slidewire, or from an independent slidewire the output of which is applied to a summing circuit in conjunction with an output from the amplifier. Variations in span may be compensated for in various ways including regulation of the amount of amplifier output voltage or of the other voltage summed, and source standardizing variations in the summed voltage are compensated for in various ways, so that the fast response signal is fully calibrated and can be used to indicate values of the material characteristic or to control that characteristic while the material is being manufactured for example.

PREAMBLE

This invention relates to a system for measuring a characteristic of material, which system is of the type that has a relatively slow feedback system, for example mechanical feedback, and preferably high speed electronic feedback also, for balancing the system, and in particular to such a system wherein an output signal representing information concerning the material characteristic being measured, may be obtained faster than such information has heretofore been obtained from the mechanical feedback arrangement.

In one specific example, this invention relates to a nucleonic measuring system of the type disclosed in the Chope Pat. 2,790,945. In that patent, a characteristic of the material passing through the nucleonic radiation path, is measured by use of a dual feedback arrangement including an electronic feedback and an electromechanical or servo feedback. The position of the servo represents the measure of the material characteristic. The characteristic being measured may be either thickness if the density of the material moving through the radiation beam is constant, or density if the thickness of the moving material is constant. In either case, the material is measured effectively on the basis of weight per unit area, as is well known for nucleonic gauges.

While the invention is described in detail hereinafter in relation to a nucleonic null balancing measuring system having a relatively slow feedback plus an electronic feedback, it is to be emphasized that the electronic feedback is not basically essential though highly preferable, nor does the system need to be of the nucleonic type since basically the invention is applicable to X-ray or other radiation basis weight measuring systems as well as to null balancing systems in general regardless of the type sensor used.

It is an object of the present invention to provide an output signal representing information concerning the material characteristic being measured in a null balancing system, at a response rate much faster than is available from the electromechanical or other type of slow response feedback. At the same time, it is an object of this invention to improve the frequency response of the output of such a system. These objects are provided for by using the voltage summation of at least a part of the amplifier output voltage plus the electromechanical or other type slow response feedback voltage or its proportional counterpart.

Figure 1:
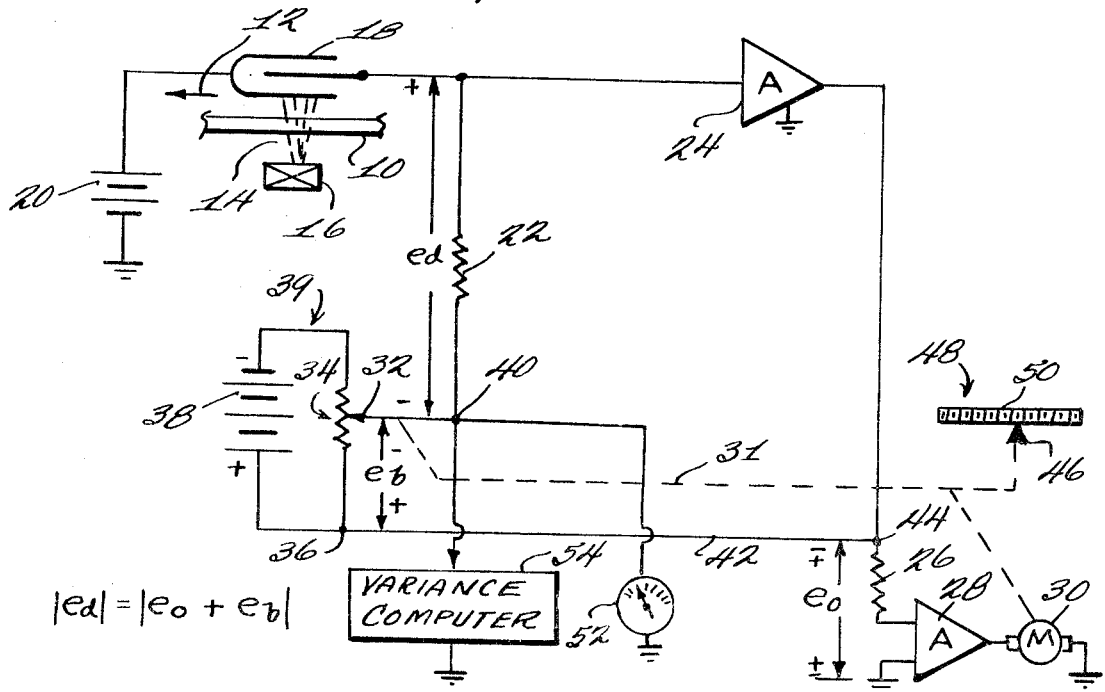
Figure 2:
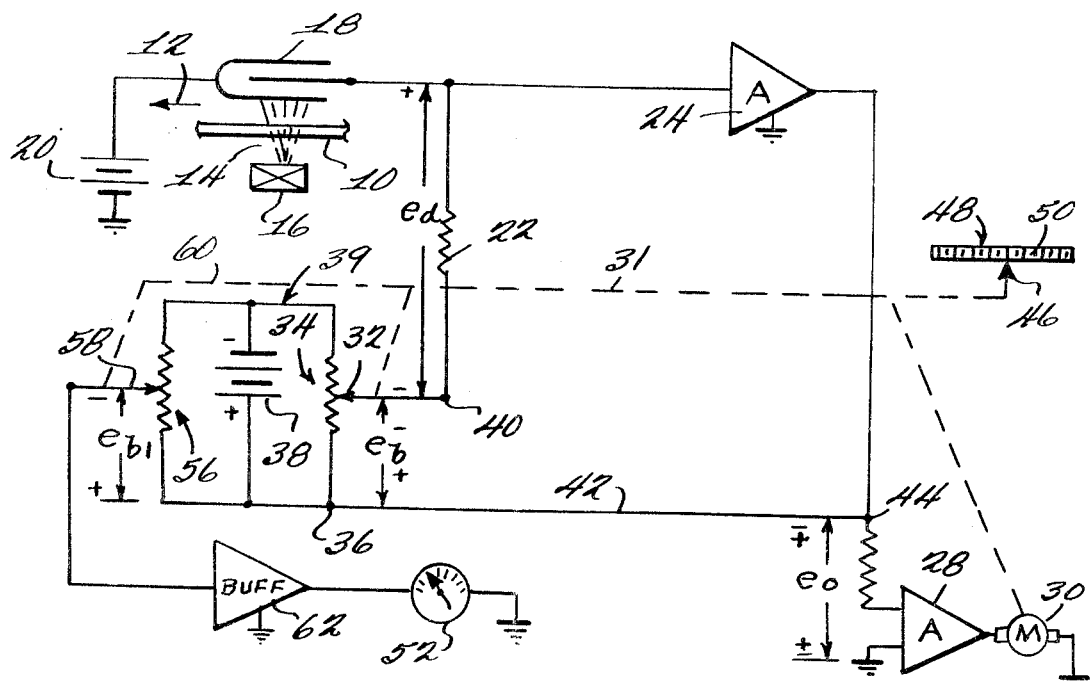
Figure 3:
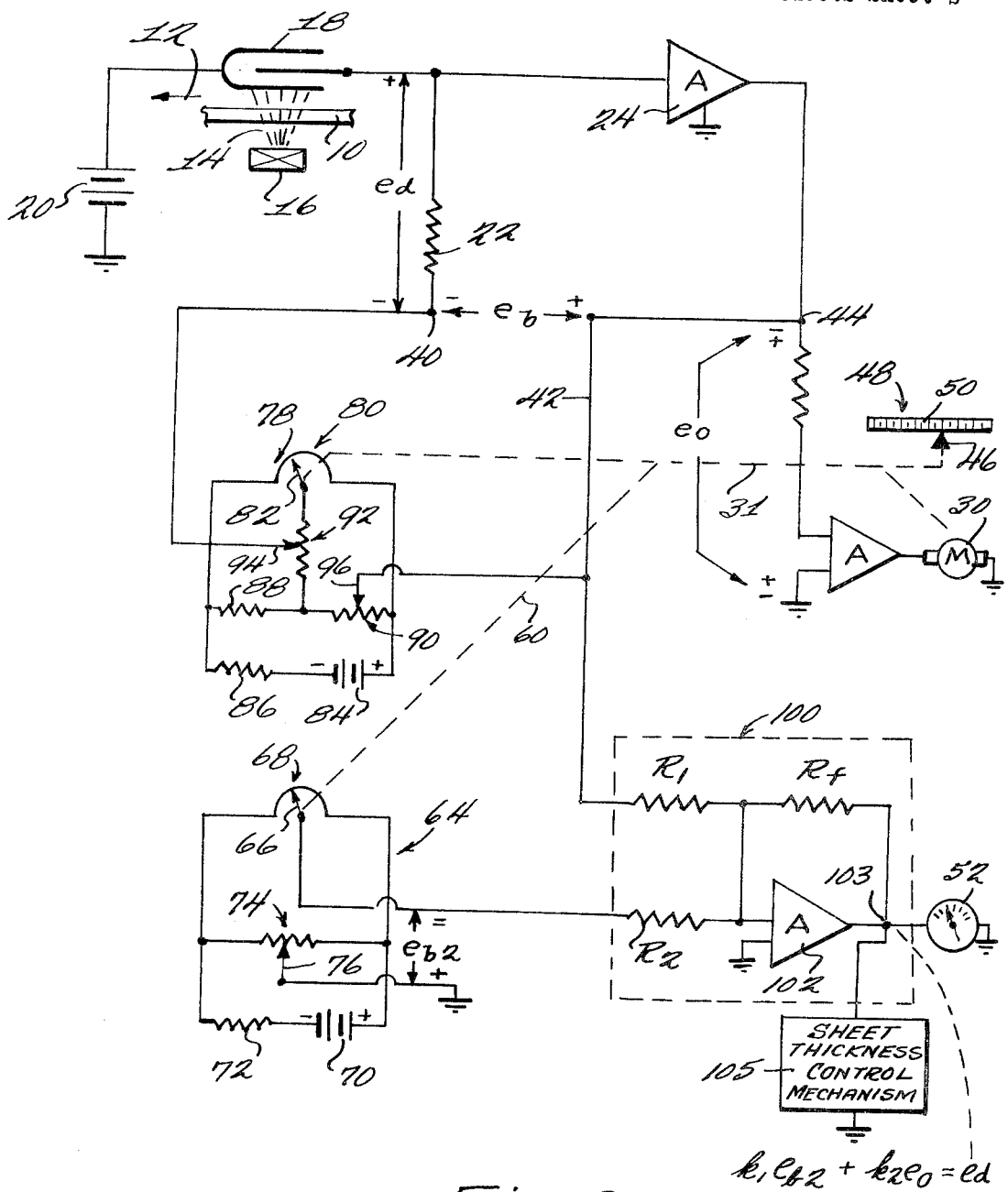
Figure 4:
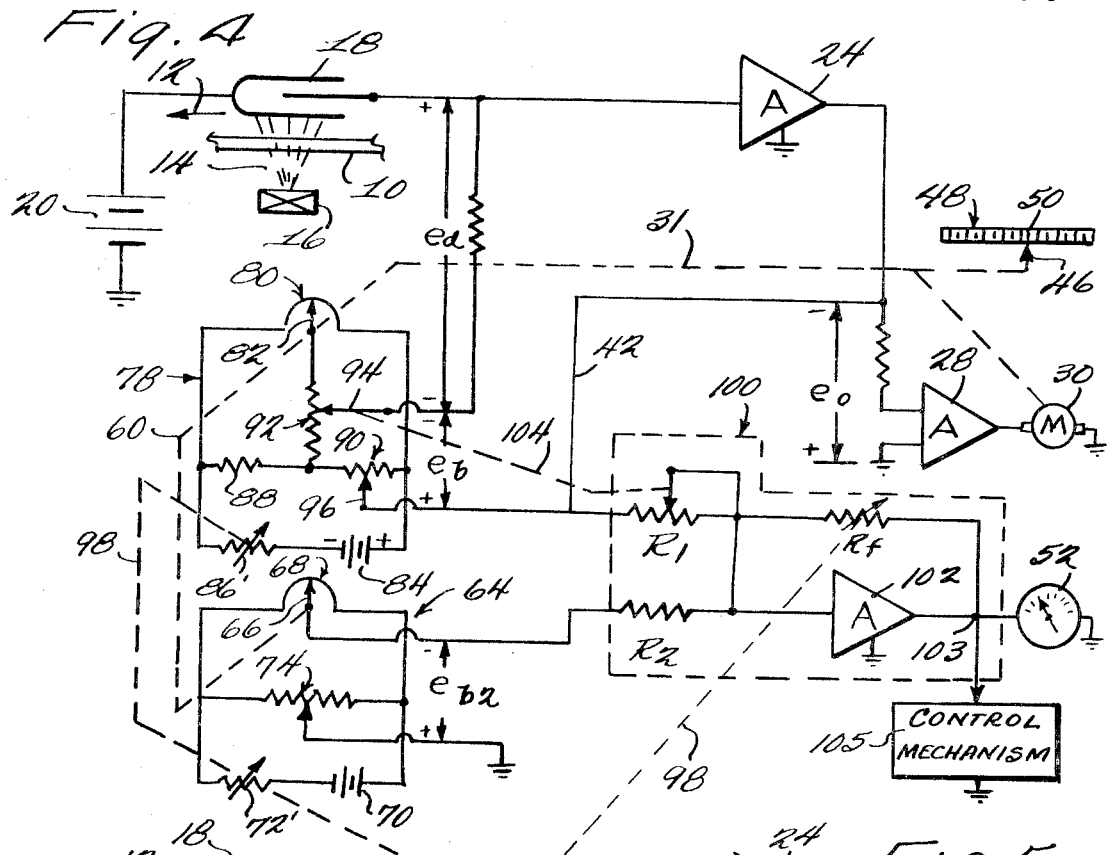
Figure 5:
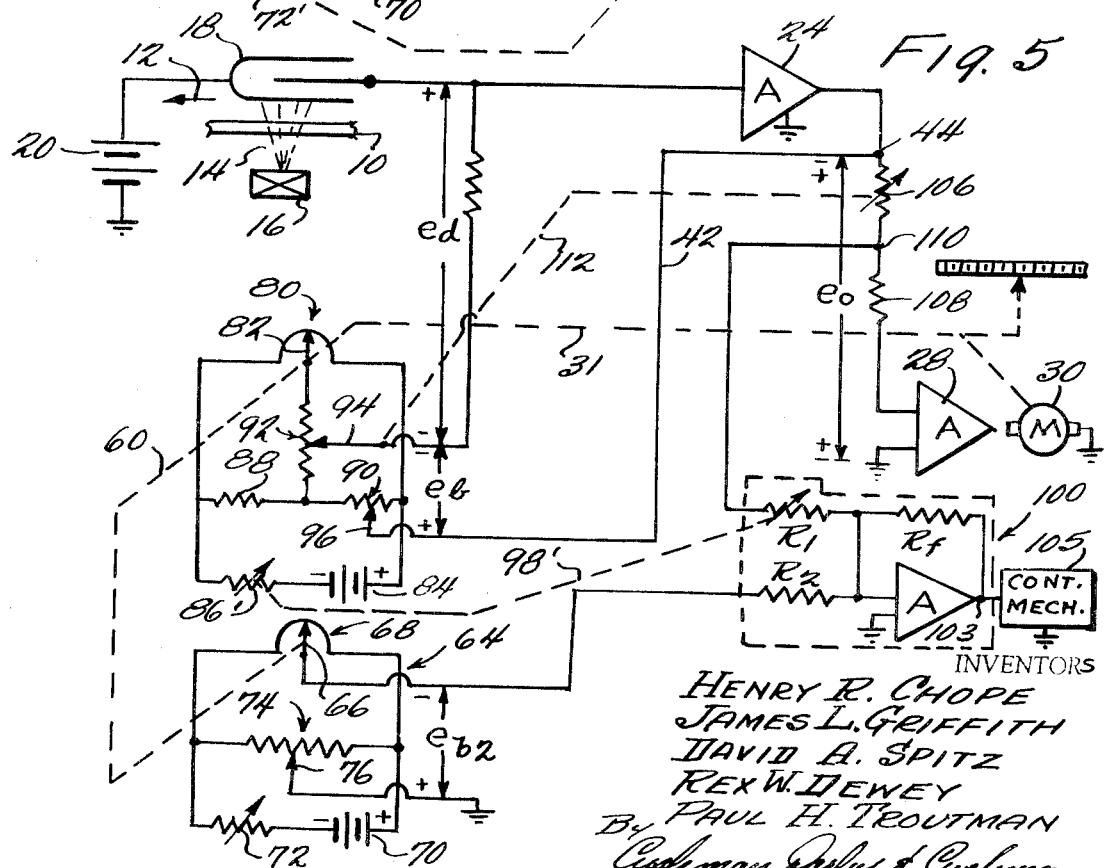

Further objects and advantages of this invention along with their provisions will become apparent to one of ordinary skill in the art upon reading the appended claims and the following detailed description in conjunction with the attached drawings, wherein:

FIG. 1 schematically represents one embodiment of the invention wherein the summation voltage is obtained directly from the lower end of the high megohm resistor, FIG. 2 is another embodiment of the invention wherein the summation voltage is obtained by a repeat slidewire electrically connected across the measuring slidewire, FIG. 3 is a further embodiment of the invention wherein the summation voltage is obtained from an electrically independent repeat slidewire and the amplifier output voltage, FIG. 4 represents an embodiment similar to that of FIG. 3 with automatic means for compensating the output signal for variations in span, and FIG. 5 illustrates another way for compensating for span variations.

DETAILED DESCRIPTION

While FIGS. 1-5 depict the invention in a measuring system or gauge of the nucleonic transmission type, a nucleonic or other type backscatter arrangement may be used as well.

In FIG. 1, the material to be measured as to its thickness is represented as a sheet 10 which is moving leftwardly as indicated by arrow 12, through the nucleonic radiation path 14 established by a conventional nucleonic source 16. Nucleonic detector 18 operated by a suitable voltage source 20, receives the radiations not absorbed by sheet 10, and provides a corresponding detector output current through a conventional high megohm resistor 22. Though not shown in this embodiment and the others described herein, a condenser is normally connected across the high megohm resistor 22. The resulting signal voltage $e_d$ developed across resistor 22 (as reduced by the feedback described below) is applied to a phase reversal amplifier 24, which produces an output voltage $e_o$ across resistor 26 and the input of the electromechanical feedback system, specifically the input of servo amplifier 28. Servo amplifier 28 operates servo motor 30, which in turn via mechanical conection 31, varies the nulling bias $e_b$ obtained between the tap 32 of slidewire 34 and junction 36. This slidewire is connected across batter 38 in order to provide the variable nulling bias source 39. As shown, slidewire tap 32 is connected to the bottom or lower end of the high megohm resistor 22, by junction 40. The polarity of battery 38 is such as to cause the nulling bias $e_b$ to oppose the developed signal voltage $e_d$ across the high megohm resistor 22.

Besides the feedback of the variable nulling bias $e_b$, the amplifier output voltage $e_n$ is also fed back by virtue of line 42 connecting junctions 36 and 44. This provides for an additive connection of the amplifier output voltage $e_o$ and the nulling bias $e_b$.

In operation, the amplifier output voltage $e_o$ fed back plus the nulling bias $e_b$ as varied by servo motor 30 causes at junction 40 to ground, a feedback voltage which opposes and equals the developed signal voltage $e_d$ at all times. Any difference between the developed signal voltage $e_d$ and the feedback voltage, as caused by a change in the former due to a change in the detector output current, is applied to amplifier 24 to develop the amplifier output voltage $e_o$. As long as amplifier 24 provides an output sufficient to drive amplifier 28 and servo motor 30, nulling bias $e_b$ continues to be varied by the servo motor until the output of amplifier 24 is no longer sufficient to drive servo motor 30 through amplifier 28. The servo motor therefore comes to rest, at least momentarily, and its position as noted by arm 46 of indicator 48 relative to scale 50 thereof, gives information concerning the thickness of sheet 10. Scale 50 may be calibrated in terms of thickness, if desired.

FIG. 1 as described thus far may be further detailed as desired in accordance with the disclosure in the aforementioned Chope Pat. 2,790,945. For example, amplifier 24 is preferably of the electrometer type as detailed in FIG. 3 of the Chope patent, while the variable source 39 of nulling bias $e_b$ and the servo arrangement may also be like that described therein.

One characteristic of the above-described dual feedback system, on which the present invention is based, is that the sum of the amplitudes of the amplifier output voltage $e_o$ fed back and the nulling bias $e_b$ is always equal to the amplitude of the developed voltage $e_d$. It is, therefore, possible to obtain from the circuitry described above and in the aforementioned Chope Pat. 2,790,945, an output signal representing information concerning the material characteristic being measured, much faster than such a signal can be obtained with indicator 48, by operating on the summed feedback voltage or on a voltage corresponding thereto. In particular, this invention is based upon the realization that the instantaneous nulling bias, or a voltage corresponding thereto, as summed with at least a portion of the output voltage from amplifier 24 may be employed to provide a fast response signal giving desired information containing the material characteristic being measured. In FIG. 1, use is made of the inherent summing at point 40 of the amplifier feedback voltage $e_o$ and the instant nulling bias $e_b$ to obtain a fast response signal on indicator 52 for frequency analysis purposes, for example. The fast response signal from junction 40 also indicates variation in the thickness of sheet 10 and variance may be computed by computer 54 connected between junction 40 and ground. Such a computer 54 may be constructed and operated in the manner disclosed in Radley Pat. No. 2,965,300. If D.C. voltage is present at junction 40, as it would be in FIG. 1, a bucking battery or other D.C. removal circuit not shown may be employed between junction 40 and computer 54 to remove the excess D.C. level while leaving a varying D.C. voltage, though such is not essential. A buffer amplifier between junction 40 and variance computer 54 may also be employed, if desired, for isolation purposes.

Another way of obtaining a summation voltage is to employ a repeat slidewire 56 as shown in FIG. 2. This slidewire is electrically connected across nulling bias source 39, i.e., across battery 38 and the measuring slidewire 34, and has its tap 58 mechanically connected to servo motor 30 as indicated by the extension 60 of dash line 31. This causes tap 58 to move in correspondence with tap 32, and therefore the voltage $e_{b1}$ between the tap 58 and point 36 corresponds to bias $e_b$, if it is not also equal thereto. Since amplifier output voltage is also connected to point 36 by line 42, the voltage between tap 58 and ground is the summation voltages of $e_o$ and $e_{b1}$ and consequently, a fast response signal is obtainable therefrom. Tap 58 is connected to an indicator 52 for frequency analysis purposes, for example, preferably through a buffer amplifier 62 for providing isolation between the summed output and the high impedance circuits associated with the high megohm resistor 22. Of course, tap 58 may be connected to a variance computer (through a buffer if desired) as in FIG. 1, and the D.C. level in any case may be removed as before noted.

FIG. 3 illustrates a further embodiment for obtaining summation of the amplifier output voltage and a voltage corresponding to the instant nulling bias. In this embodiment a separate source 64 of variable voltage is employed to obtain the corresponding instant voltage $e_{b2}$ from the tap 66 to ground of a slidewire 68. This source 64 is shown as being of the bridge type, which includes a battery 70 in series with a resistance 72 for determining the voltage across slidewire 68. (Battery 70 and each of the other batteries in FIGS. 1–5 may be replaced by any other type of D.C. source such as rectified and regulated A.C. sources as conventional in practice.) The bridge further includes a potentiometer 74 having a variable tap 76 connected to ground for setting the target point on slidewire 68 so that $e_{b2}$ then equals zero. Since tap 66 is servo controlled as indicated by dash line 60, voltage $e_{b2}$ is an error voltage proportional to the measured deviation from the desired or target thickness set by tap 76. This variable voltage source 64 may be replaced if desired by any other type of a variable voltage source that may be controlled in its output voltage by mechanical connection with servo motor 30 as indicated by dash line 60 extending from dash line 31. For example, source 64 may be replaced by a simple battery and slidewire combination or by the more elaborate type of bridge 78, which provides the variable source of nulling bias $e_b$.

Bridge 78 is constructed similar to the nulling bridge source in FIG. 2 of the aforementioned Chope Pat. 2,790,945, and includes a measuring slidewire 80 having a variable tap 82 controlled in position by servo motor 30, as indicated by dash line 31, in the same manner previously described relative to the control of potentiometer tap 32 in FIGS. 1 and 2. Slidewire 80 is connected across a battery 84 and resistor 86, and the series connection of equal valued resistances 88 and 90. The junction between these resistors is connected to tap 82 through a span adjusting potentiometer 92, which has a tap 94 connected to the lower end of the high megohm resistor 22 at junction 40. The output voltage $e_o$ of amplifier 24 is added to the instant voltage from bridge 78 by being applied thereto through tap 96 on potentiometer 90. Operation of this type of bridge 78 is fully described in the above-mentioned Chope patent.

The error of deviation voltage $e_{b2}$ from source 64 is proportional to the nulling bias $e_b$ by a factor $k_1$, which may have a value of one or more, or even less.

The output voltage $e_o$ from amplifier 24 is applied to an operational amplifier 100 via an input resistor $R_1$, and the variable voltage $e_{b2}$ from source 64 is coupled thereto by resistor $R_2$. These two resistors are connected together as an input to amplifier 102, which has a feedback resistor $R_f$, making operational amplifier 100 a summing device. Therefore, indicator 52 provides a fast response signal from the voltage summation at junction 103 of the amplifier output voltage and the $e_{b2}$ voltage from source 64. Since $e_{b2}$ is proportional to $e_b$, the voltage summation equals $e_d$.

The output from amplifier 102 may be applied directly to indicator 52 for frequency analysis purposes for example, or through a variance computer as indicated in FIG. 1, to effect a fast response signal that represents desired information concerning the characteristic of material 10 that is being measured. In addition the output of operational amplifier 100 may be used, as detailed below, to control thickness of sheet 10 or to effect a thickness registration from indicator 52.

Resistors $R_1$ and $R_2$ may be equal in value, if desired. However, if it is desired to use the voltage summation signal at junction 103 to operate the sheet thickness control mechanism 105 or to cause a thickness registration on indicator 52, it may be necessary to make resistors $R_1$ and $R_2$ unequal, especially if voltages $e_o$ and $e_{b2}$ are not of compatible levels for summing. For example, the voltage of battery 70 in bridge 64 may cause voltage $e_{b2}$ at maximum for example, to be considerably higher than the maximum amplifier output voltage $e_o$ since the electronic feedback via line 42 (in this and all embodiments illustrated) causes approximately unity amplification by the amplifier 24 circuit. Consequently, the two voltages should be more closely equated before summation. This may be accomplished by reducing voltage $e_{b2}$, or by effectively amplifying $e_o$, using for instance the scaling effect of resistors $R_1$ and $R_2$. As an example, effective amplification of voltage $e_o$ may be accomplished in the operational amplifier 100 by making the resistance ratio $R_2/R_1$ equal to the desired amplification factor, for example in the range of from 10 to 40. This has the effect of calibrating the summation output signal at junction 103 for a given span setting of potentiometer 94, so that it may be used for a thickness indication or control purposes, for example, to operate the thickness control mechanism 105, which may control the thickness of sheet 10 in any conventional manner. However, the span of nulling voltage $e_b$ may need to be varied, as by regulation of potentiometer tap 94 in bridge 78 from time to time to compensate for meter range changes for example as indicated in Chope Pat. 2,829,268 in accordance with changes in the system operating point on the conventional non-linear absorption curve. Such a change in span causes a change in the summation voltage from operational amplifier 100. Consequently, while preamplification of the amplifier output voltage $e_o$ by the desired $R_2/R_1$ ratio in the operational amplifier 100 or reduction therein by that ratio of the $e_{b2}$ voltage causes the summation voltage at junction 103 to be compensated for a given span setting, a change in that span setting reduces the span compensation in the summation voltage. Even then, however, the summation voltage is at least approximately span compensated sufficiently for some control or thickness purposes.

When the summation voltage at junction 103 is fully span compensated, the amplifier output voltage $e_o$ is multiplied in effect by a factor $k_2$ which like factor $k_1$ may have a value of one or more or even less. But in any event, the developed signal voltage $e_d$ across high megohm resistor 22 is still equalled by the sum of $k_1 e_{b2}$ and $k_2 e_o$.

FIG. 4 illustrates another and more accurate way to compensate for span variations by regulating the amount of amplifier output voltage $e_o$ or of voltage $e_{b2}$ that is applied to the summing operational amplifier 100. In FIG. 4, the input resistor $R_1$, which in this case may be a shaped variable resistor, couples the amplifier output voltage $e_o$ into the operational amplifier 100, and is variable in accordance with variations in the span, as indicated by the dash line 104 connecting the span adjustment potentiometer tap 94 with the movable tap of resistor $R_1$. Alternatively, resistor $R_2$ may be ganged to tap 94 to compensate for span variations. In addition, the summation voltage at junction 103 may be source standardized by varying the feedback resistor $R_f$ in the operational amplifier 100 and the D.C. voltage drop effected across bridge 64 by variable resistor $72'$ in accordance with variations in the source standardizing potentiometer $86'$ as indicated by the ganging line 98. That is, as explained in the Chope Pat. 2,829,268, potentiometer $86'$ may need to be operated from time to time to standardize the system for various changes including source decay, buildup of dirt on the source, etc., as is well known. When this is done, it is preferable then to compensate the summation voltage at junction 103 for the resulting change therein effected by source standardization. This is the purpose of gang 98.

Greater accuracy can be obtained in the use of the summation voltage at junction 103 in FIG. 4 for thickness control or registering purposes, because of the span and source compensation described, as compared to the general approximation effected with the FIG. 3 circuitry by pre-setting the ratio $R_2/R_1$.

Still a further way to calibrate accurately the output signal from operational signal amplifier 100 so that it can be used more effectively for controlling the thickness of sheet 10, is illustrated in FIG. 5. In this embodiment, the amount of the output voltage $e_o$ from amplifier 24, which is applied through the operational amplifier input resistor $R_1$, is regulated by developing the amplifier output voltage $e_o$ across a series of impedances including variable resistor 106 and a resistor 108, which form a voltage divider arrangement, with resistor $R_1$ being connected to the junction 110 between resistances. Resistor 106 is then regulated in resistance value in accordance with changes in the span adjusting potentiometer tap 94, as indicated by dash line 112. Changes in the value of resistor 106 by movement of potentiometer tap 94, causes corresponding changes in the voltage from junction 110 to ground, which in turn changes the amplifier voltage that resistor $R_1$ couples into operational amplifier 100 for summing purposes according to the ratio $R_2/R_1$. This effects span compensation in the operational amplifier output, while source standardization therein may be effected by regulating the value of $R_1$ in accordance with the source standardizing potentiometer $86'$ as indicated by the gang line $98'$. Alternatively, source standardization of the summation voltage at junction 103 in FIG. 5 may be accomplished in the same manner as shown in FIG. 4. Accordingly, the span compensated and source standardized summation voltage at junction 103 may be used to indicate thickness as before, or to operate the sheet thickness control mechanism 105 for controlling the thickness of sheet 10, as previously described.

From the foregoing, it is apparent that the summation voltage at junction 103 in FIGS. 4 and 5 may be calibrated to have a constant number of volts per unit of measure.

In a FIG. 5 type of embodiment with either type of source standardizing of the voltage at junction 103, span compensation thereof may be effected by causing the amount of amplifier output voltage $e_o$ applied to $R_1$ to be taken from the tap of a potentiometer (not shown) connected from point 44 to ground when that tap is connected to dash line 112 instead of variable resistor 106.

In many measuring systems of the type described above and in the aforementioned Chope Pat. 2,790,945, span is adjusted to accommodate different ranges on indicating or recording instrument such as recorder 48, by replacing one potentiometer 92 and its tap 94 with another pre-set potentiometer. By a switch arrangement (not shown) in such a case situation, or in any other case if desired, variable resistor $R_1$ in FIG. 4 and variable resistor 106 in FIG. 5 may be modified by a switch arrangement as opposed to movement of their respective taps. While an indicator 48 has been shown in connection with all of the embodiments of this invention in FIGS. 1–5, it is to be understood that no such indicator is necessary to obtain the fast response signal of this invention.

It is emphasized while obtaining a fast response signal which represents information concerning the material characteristic being measured, this invention also provides for a much greater frequency response, thereby obviating errors which may otherwise occur in the computing of variance, for example, if the variance computer were operated from recorder 48 or the output of serve motor 30. According to the present invention the feedback voltage, or its counterpart voltage summation disclosed, is suitable for feeding a variance computor, a frequency analyzer, or a thickness registering or control device since the system response is sufficient to pass the the full band of process signal frequencies that occur in the measuring system.

In analyzing this invention as above described in its various embodiments, it is apparent that the input signal $e_d$ as caused by the detector output current, has both a low frequency component and a high frequency component, while a feature of this invention is that the proportion of the low frequency component to the high frequency component in the summation voltage is the same as the proportion of the low to high frequency components in the corresponding input signal $e_d$.

It is thus apparent that this invention has provided for all of the objects and advantages herein mentioned. Other objects and advantages, and even further modifications of the invention, will become apparent to those of ordinary skill in the art upon reading the foregoing detailed description of exemplary embodiments of the invention. These embodiments are not to be considered limitative since the invention is defined by the appended claims.

What is claimed is:

1. In apparatus for measuring a characteristic of material effectively on the basis of weight per unit area, which apparatus includes means including a radiation source and detector unit for establishing a radiation path from said source to said detector through which path said material may pass to be measured, said detector providing an output current variable in accordance with variations in the amount of source radiation incident upon said detector, a detector output resistor having one end connected to receive said detector output current for providing a developed signal voltage proportional to said current, means including a voltage amplifier connected to said one end of said resistor for developing an amplifier output voltage in response to a change in the said developed signal voltage, and a feedback circuit connected to the other end of said detector output resistor for providing a feedback voltage, including electromechanical means and at least a variable source of nulling bias, said electromechanical means having a given rate of response to said amplifier output voltage for varying said bias until the said feedback voltage substantially equals said developed signal voltage and the amplifier output voltage reduces to substantially zero to prevent response thereto by said electromechanical means, the improvement comprising utilization means having a response rate substantially faster than said given response rate of said electromechanical means for providing from a summation of voltages, including at least a portion of said amplifier output voltage and a second voltage which is at least proportional to changes in said nulling bias, a fast response signal representing information concerning said material characteristic.

2. In apparatus for measuring a characteristic of material effectively on the basis of weight per unit area, which apparatus includes means including a radiation source and detector unit for establishing a radiation path from said source to said detector through which path said material may pass to be measured, said detector providing an output current variable in accordance with variations in the amount of source radiation incident upon said detector, a detector output resistor having one end connected to receive said detector output current for providing a developed signal voltage proportional to said current, means including a voltage amplifier connected to said one end of said resistor for developing an amplifier output voltage in response to a change in the said developed signal voltage, and a feedback circuit connected to the other end of said detector output resistor for providing a feedback voltage, including electromechanical means and at least a variable source of nulling bias, said electromechanical means having a given rate of response to said amplifier output voltage for varying said bias until the said feedback voltage substantially equals said developed signal voltage and the amplifier output voltage reduces to substantially zero to prevent response thereto by said electromechanical means, the improvement comprising utilization means having a response rate substantially faster than said given response rate of said electromechanical means for providing from a summation of voltages, including at least a portion of said amplifier output voltage and a second voltage, a fast response signal representing information concerning said material characteristic, wherein said second voltage is said nulling bias and wherein the said at least a portion of said amplifier output voltage is additively connected to said nulling bias in said feedback circuit and said fast response signal means is connected to the said other end of said detector output resistor so that said feedback voltage is the said voltage summation.

3. Apparatus as in claim 1 wherein said variable source of nulling voltage includes a first slidewire having a tap connected to the said other end of said detector output resistor and varied by said electromechanical means as aforesaid, and wherein said fast response signal means includes a repeat slidewire electrically connected across said first slidewire and having a tap also varied by said electromechanical means for developing said voltage summation.

4. Apparatus as in claim 1 wherein said fast response signal means includes a variance computer operative on said voltage summation to indicate the variance of said material characteristic being measured.

5. Apparatus as in claim 1 wherein said feedback circuit includes means for varying the span of the said feedback voltage and said improvement further includes means for compensating the said fast response signal for variations in said span by regulating the effective amount of amplifier output voltage in said voltage summation in accordance with span variations effected by said span varying means.

6. Apparatus as in claim 1 wherein said fast response signal means includes a second source of bias as said second voltage for providing a second variable bias electrically independent of the first-mentioned variable bias but variable in correspondence thereto by the said electromechanical means, and means for summing said second variable bias and at least a portion of said amplifier output voltage to provide said voltage summation.

7. Apparatus as in claim 6 including means for effectively amplifying said amplifier output voltage before it is summed with said second variable bias.

8. Apparatus as in claim 6 wherein said feedback circuit includes means for varying the span of said feedback voltage and wherein said summing means includes an operational amplifier having a first input resistor connected to receive at least a portion of said amplifier output voltage and a second input resistor connected to receive at least a portion of said second variable bias, said improvement further including means for compensating the said fast response signal for variations in said span by varying said first input resistor in accordance with the span variations effected by said span varying means.

9. Apparatus as in claim 6 wherein said feedback circuit includes means for varying the span of said feedback voltage and wherein the said amplifier output voltage is developed across impedance means including variable resistance means, said improvement further including means for compensating the said fast response signal for variations in said span by varying the said resistance means in accordance with the span variations effected by said span varying means.

10. Apparatus for nucleonically measuring a characteristic of material effectively on the basis or weight per unit area, comprising:

means including a nucleonic source and detector unit for establishing a nucleonic radiation path from said source to said detector through which path said material may pass to be measured, said detector providing an output current variable in accordance with variations in the quantity of radiations incident upon said detector, a detector output resistor having one end connected to receive said detector output current for providing across said resistor a developed signal voltage proportional to said current, means including a voltage amplifier connected to said one end of said resistor for developing an amplifier output voltage in response to a change in the said developed signal voltage, a feedback circuit connected between said amplifier and the other end of said detector output resistor and including a variable source of nulling bias additively connected to said amplifier output voltage, for providing a feedback voltage which opposes and equals said developed signal voltage at all times, electromechanical means having a given rate of response to said amplifier output voltage for varying said bias until the said feedback voltage consists, substantially of said bias and the amplifier output voltage reduces substantially to zero to prevent response thereto by said electromechanical means, and means having a response rate substantially faster than said given response rate of said electromechanical means and being connected to the said other end of said detector output resistor for providing from said feedback voltage a fast response signal representing information concerning said material characteristic.

11. Apparatus for nucleonically measuring a characteristic of moving material effectively on the basis or weight per unit area, comprising:

means including a nucleonic source and detector unit for establishing a nucleonic radiation path from said source to said detector through which path said material may pass to be measured, said detector providing an output current variable in accordance with variations in the quantity of radiations incident upon said detector, a detector output resistor having one end connected to receive said detector output current for providing across said resistor a developed signal voltage proportional to said current, means including a voltage amplifier connected to said one end of said resistor for developing an amplifier output voltage in response to a change in the said developed signal voltage, a feedback circuit connected between said amplifier and the other end of said detector output resistor and including a variable source of nulling bias additively connected to said amplifier output voltage, for providing a feedback voltage which opposes and equals said developed signal voltage at all times, electromechanical means having a given rate of response to said amplifier output voltage for varying said bias until the said feedback voltage consists substantially of said bias and the amplifier output voltage reduces substantially to zero to prevent response thereto by said electromechanical means, and means having a response rate substantially faster than said given response rate of said electromechanical means for providing a fast response signal representing information concerning said material characteristic, said fast response signal means including a second source of variable bias electrically connected across the first-mentioned source of variable bias and being varied by said electromechanical means in proportion to the variation thereby of said nulling bias, to provide a voltage corresponding to said feedback voltage, and means for obtaining said fast response signal from said corresponding voltage.

12. Apparatus for nucleonically measuring a characteristic of moving material effectively on the basis or weight per unit area, comprising:

means including a nucleonic source and detector unit for establishing a nucleonic radiation path from said source to said detector through which path said material may pass to be measured, said detector providing an output current variable in accordance with variations in the quantity of radiations incident upon said detector, a detector output resistor having one end connected to receive said detector output current for providing across said resistor a signal voltage proportional to said current, means including a voltage amplifier connected to said one end of said resistor for developing an amplifier output voltage in response to a change in the said developed signal voltage, a feedback circuit connected between said amplifier and the other end of said detector output resistor and including a variable source of nulling bias additively connected to said amplifier output voltage, for providing a feedback voltage which opposes and equals said developed signal voltage at all times, electromechanical means having a given rate of response to said amplifier output voltage for varying said bias until the said feedback voltage consists substantially of said bias and the amplifier output voltage reduces substantially to zero to prevent response thereto by said electromechanical means, and means having a response rate substantially faster than said given response rate of said electromechanical means, including means for developing a second variable bias proportional at all times to said nulling bias and means for summing said second variable bias and at least a portion of said amplifier output voltage to provide a summation voltage, for effecting therefrom a fast response signal representing information concerning said material characteristic.

13. Apparatus as in claim 12 wherein said second variable voltage developing means includes a slidewire and the summing means includes electrical connection of said slidewire across said nulling bias source, said slidewire having a tap mechanically connected to said electromechanical means for operation thereby in correspondence with variation in said nulling bias, whereby said summation voltage is produced at said slidewire tap.

14. Apparatus as in claim 12 wherein said second variable bias developing means is electrically independent from said nulling bias source but is mechanically connected thereto and to said electromechanical means for variation thereby of said second bias in correspondence to variation thereby of said nulling bias.

15. Apparatus as in claim 12 wherein said second variable bias developing means is electrically independent from said nulling bias source but is mechanically connected thereto and to said electromechanical means for variation thereby of said second bias in correspondence to variation thereby of said nulling bias, and wherein said summing means includes an operational amplifier having two input resistors the first of which is connected to couple at least a portion of the amplifier output voltage to the operational amplifier and the second of which is connected to couple at least a portion of said second variable bias thereto.

16. Apparatus as in claim 15 wherein the values of said first and second input resistors are predetermined to cause the amplifier output voltage coupled by the first resistor to be substantially amplified effectively before it is summed with the said second variable bias.

17. Apparatus for nucleonically measuring a characteristic of moving material effectively on the basis or weight per unit area, comprising:
means including a nucleonic source and detector unit for establishing a nucleonic radiation path from said source to said detector through which path said material may pass to be measured,
said detector providing an output current variable in accordance with variations in the quantity of radiations incident upon said detector,
a detector output resistor having one end connected to receive said detector output current for providing across said resistor a signal voltage proportional to said current,
means including a voltage amplifier connected to said one end of said resistor for developing an amplifier output voltage in response to a change in the said developed signal voltage,
a feedback circuit connected between said amplifier and the other end of said detector output resistor and including a variable source of nulling bias additively connected to said amplifier output voltage, for providing a feedback voltage which opposes and equals said developed signal voltage at all times,
electromechanical means having a given rate of response to said amplifier output voltage for varying said bias until the said feedback voltage consists substantially of said bias and the amplifier output voltage reduces substantially to zero to prevent response thereto by said electromechanical means,
means having a response rate substantially faster than said given response rate of said electromechanical means, including means for developing a second variable voltage proportional at all times to said nulling bias and means for summing at least a portion of said second variable voltage and at least a portion of said amplifier output voltage to provide a summation voltage, for effecting therefrom a fast response signal representing information concerning said material characteristic,
said feedback circuit including means for varying the span of said feedback voltage, and
means for compensating the fast response signal for variations in said span by regulating the effective amount of at least one of the voltages summed by said summing means in accordance with span variations effected by said span varying means.

18. Apparatus as in claim 17 wherein said summing means includes an operational amplifier having a first input resistor connected to the output of the first-mentioned amplifier and connected to said variable voltage source,
said span compensating means including means for varying the resistance value of said first input resistor in accordance with the span variations effected by said span varying means.

19. Apparatus as in claim 16 wherein the amplifier output voltage is developed across impedance means including variable resistance means,
said span compensating means including means for varying the said resistance means in accordance with the span variations effected by said span varying means.

20. Apparatus as in claim 17 including source standardizing means in said feedback circuit which when varied causes a change in said summation voltage and means for compensating said summation voltage for said change therein in accordance with variations in said source standardizing means.

21. Apparatus as in claim 20 wherein said summing means includes an operational amplifier having a first input resistor for receiving the desired amplifier output voltage to be summed and a second input resistor for receiving the desired second variable voltage to be summed,
said summation voltage compensating means including means for varying said first input resistor in accordance with variations in said source standardizing means.

22. Apparatus as in claim 20 wherein said summing means includes an operational amplifier having a feedback resistor and wherein said nulling bias source is a first bridge circuit having a respective bridge voltage developing means and said second variable source is a second bridge circuit having a respective bridge voltage developing means,
said source standardizing means including means for varying the said bridge voltage of said first bridge circuit,
said summation voltage compensating means including means for varying both the said bridge voltage of said second bridge circuit and the said feedback resistor in accordance with variations in the bridge voltage of said first bridge circuit.

23. In a null self-balancing measuring system which receives from a sensing transducer a signal containing a low frequency component and a high frequency component wherein at least some of the high frequencies have a rate of variation which exceeds the speed of response and balance rate of a null-balance measuring device, the improvement comprising:
said null-balance measuring device for developing a feedback signal to null and balance the said low frequency components of said sensing transducer signal,
means for amplifying the said high frequency components of said sensing transducer signal,
means for combining said null-balance feedback signal with a signal from said amplifying means, said combined signal being equal in magnitude at all times to the original signal from said sensing transducer,
means for feeding back said combined signal to null balance the original signal from said sensing transducer, and
means for further combining a signal proportional to said null-balance feedback signal with a signal proportional to the output of said amplifying means so as to yield a total output signal having low and high frequency components combined in a proportion equal to the proportion of low frequency to high frequency components as existed in the respective signal from said sensing transducer.

24. Apparatus as in claim 2 wherein said fast response signal means includes a variance computer operative on said voltage summation to indicate the variance of said material characteristic being measured.

25. In combination with a nuclear gauge for measuring a characteristic of a material passing through a radiation path established by a nucleonic source and a detector,
said gauge including means adapting said detector to provide a first signal indicative of radiation incident on said detector,
an adjustable source of a nulling bias signal,
and means responsive to a difference between said first signal and said nulling bias signal for mechanically adjusting, at a first response rate, said nulling bias signal source to reduce said difference to a value approaching zero,
the improvement comprising:
means responsive to the sum of the magnitudes of said nulling bias signal and said difference between said nulling bias signal and said first signal for producing, with a second response rate faster than said first response rate, an output signal indicative of the value of said characteristic.

26. In combination with a nuclear gauge for measuring a characteristic of a material passing through a radiation path established by a nucleonic source and a detector,
   said gauge including means adapting said detector to provide a first signal indicative of radiation incident on said detector,
   an adjustable source of a nulling bias signal
   and means responsive to a difference between said first signal and said nulling bias signal for mechanically adjusting, at a first response rate, said nulling bias signal source to reduce said difference to a value approaching zero,
the improvement comprising:
means for developing a second bias variable concurrently with said nulling bias by said mechanical adjusting means, and
   means responsive to the sum of said second bias and said difference between said first and nulling bias signals for producing, at a second response rate faster than said first response rate, an output signal indicative of the value of said characteristic.

References Cited
UNITED STATES PATENTS 3,180,985  4/1965  Leighton.
3,348,046  10/1967  Lloyd.

ARCHIE R. BORCHELT, Primary Examiner

U.S. Cl. X.R.

250—83.6